(12) United States Patent
Bennison et al.

(10) Patent No.: US 10,823,815 B2
(45) Date of Patent: Nov. 3, 2020

(54) HYBRID POSITION LOCATING SYSTEM IN A MANUFACTURING ENVIRONMENT

(71) Applicant: The Boeing Company, Chicago, IL (US)

(72) Inventors: Stephen John Bennison, Bellevue, WA (US); Karl Loren Johnson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 312 days.

(21) Appl. No.: 15/908,471

(22) Filed: Feb. 28, 2018

(65) Prior Publication Data

US 2019/0265327 A1 Aug. 29, 2019

(51) Int. Cl.

| G01S 5/02 | (2010.01) |
|---|---|
| B64F 5/60 | (2017.01) |
| B64F 5/10 | (2017.01) |
| G01S 5/10 | (2006.01) |
| G01S 17/66 | (2006.01) |
| G01S 17/48 | (2006.01) |
| G01S 13/75 | (2006.01) |
| G01S 5/14 | (2006.01) |
| B23Q 17/22 | (2006.01) |
| G01S 17/88 | (2006.01) |
| G01S 7/481 | (2006.01) |
| G01S 17/89 | (2020.01) |
| G01S 17/86 | (2020.01) |

(52) U.S. Cl.
CPC ............ *G01S 5/0263* (2013.01); *B23Q 17/22* (2013.01); *B64F 5/10* (2017.01); *B64F 5/60* (2017.01); *G01S 5/10* (2013.01); *G01S 5/14* (2013.01); *G01S 7/4817* (2013.01); *G01S 13/75* (2013.01); *G01S 17/48* (2013.01); *G01S 17/66* (2013.01); *G01S 17/86* (2020.01); *G01S 17/88* (2013.01); *G01S 17/89* (2013.01)

(58) Field of Classification Search
CPC combination set(s) only.
See application file for complete search history.

(56) References Cited

U.S. PATENT DOCUMENTS

| 9,423,878 | B2 | 8/2016 | Kaufman et al. |
| 9,460,479 | B1 | 10/2016 | Butler |
| 2014/0284378 | A1 | 9/2014 | Bonneau, Jr. et al. |
| 2015/0094836 | A1* | 4/2015 | Rivers ............... G05B 19/4093 700/97 |
| 2016/0266234 | A1* | 9/2016 | Pearce ................. G01S 5/0221 |

(Continued)

FOREIGN PATENT DOCUMENTS

| EP | 2538297 A2 | 12/2012 |
| EP | 2965835 A2 | 1/2016 |

OTHER PUBLICATIONS

Extended European Search Report, dated Jul. 23, 2019, regarding Application No. 19159328.4, 12 pages.

(Continued)

*Primary Examiner* — Mamadou L Diallo
(74) *Attorney, Agent, or Firm* — Yee & Associates, P.C.

(57) ABSTRACT

A tool within a manufacturing environment is located using a macro position locator to form an approximate location. A refined location is identified using the approximate location, a retro reflective target attached to the tool, and a laser tracking system.

27 Claims, 8 Drawing Sheets

(56) References Cited

U.S. PATENT DOCUMENTS

| | | | | |
|---|---|---|---|---|
| 2016/0274222 A1* | 9/2016 | Yeun | .................... | G01S 7/4812 |
| 2017/0202624 A1* | 7/2017 | Atarot | .................... | G05B 19/00 |
| 2018/0361595 A1* | 12/2018 | Troy | .................... | B25J 13/088 |
| 2019/0066331 A1* | 2/2019 | Kahle | .................... | B25F 5/00 |

OTHER PUBLICATIONS

"Mirrorcle Technologies, Inc.," Mirrorcle Technologies, Inc, accessed Feb. 28, 2018, 1 page. http://mirrorcletech.com/.

"POZYX: Accurate positioning," POZYX, accessed Feb. 28, 2018, 1 page. https://www.pozyx.io/.

* cited by examiner

HYBRID POSITION LOCATING SYSTEM IN A MANUFACTURING ENVIRONMENT

BACKGROUND INFORMATION

1. Field

The present disclosure relates generally to locating an object within a manufacturing environment. More specifically, the present disclosure relates to a cost-effective method of automatically locating an object in a manufacturing environment.

2. Background

In manufacturing, inspection is performed to verify manufacturing processes on a workpiece. For example, after drilling holes in a workpiece, dimensions of the holes are measured. As another example, after installing fasteners into holes, presence and installation of the fasteners are verified.

Many inspections of workpieces are performed by operators. For example, an operator may visually verify the presence of fasteners. As another example, an operator may use a handheld tool, such as a micrometer, to measure dimensions of a hole.

Some workpieces have hundreds or thousands of items to inspect. For workpieces with large quantities of items, inspection sampling plans may be utilized. Inspection sampling plans selectively inspect a fraction of the items.

When operators perform inspections, operators also identify the item or location inspected. Manual input of the location of the item inspected may be more time-consuming or less accurate than desired. Further, operators identifying sampling locations for inspection sampling plans may be more time-consuming than desired.

Therefore, it would be desirable to have a method and apparatus that takes into account at least some of the issues discussed above, as well as other possible issues. For example, it would be desirable to provide an apparatus and method for identifying the location of objects within a manufacturing environment in a cost-effective manner.

SUMMARY

An illustrative embodiment of the present disclosure provides a method. An operation is performed on a workpiece using a tool. The tool is detected within a manufacturing environment using a macro position locator. An approximate location of the tool is generated using the macro position locator. A refined location of the tool is identified using the approximate location and a micro position locator. Data regarding the operation is associated with the refined location.

Another illustrative embodiment of the present disclosure provides a method. A tool within a manufacturing environment is located using a macro position locator to form an approximate location. A refined location is identified using the approximate location, a retro reflective target attached to the tool, and a laser tracking system.

A further illustrative embodiment of the present disclosure provides a hybrid position locating system. The hybrid position locating system comprises an ultra-wide band radio frequency tag connected to a tool and a retro reflective target connected to the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
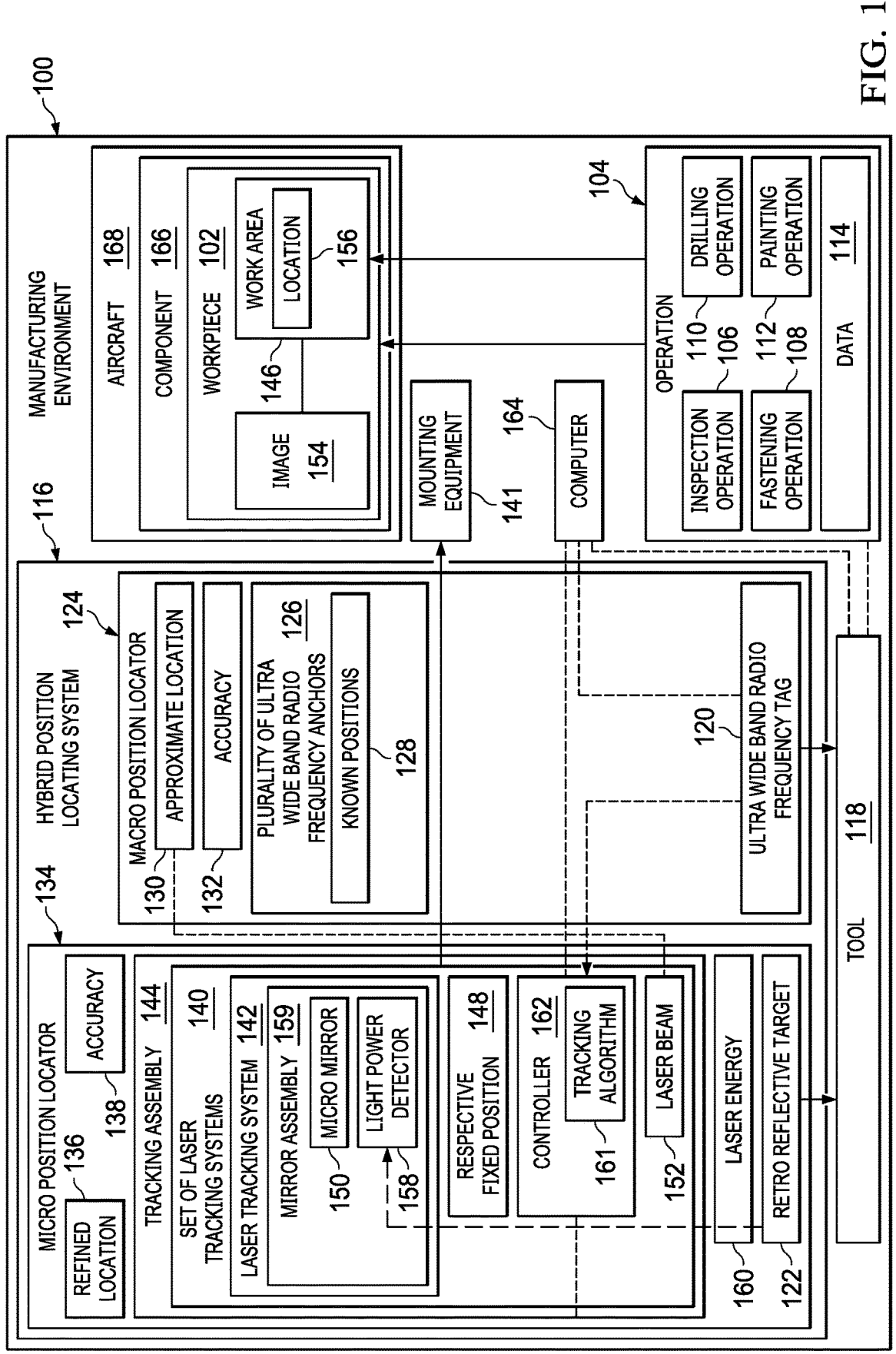
FIG. 1 is an illustration of a block diagram of a manufacturing environment in which a hybrid manufacturing environment position locating system is used to locate a tool in accordance with an illustrative embodiment.

The illustrative embodiments recognize and take into account one or more different considerations. For example, the illustrative embodiments recognize and take into account that currently work positions during inspection or other operations are not automatically measured. The illustrative embodiments recognize and take into account that as a result, performing inspections or other manual operations on a workpiece may have increased operator hours. The illustrative embodiments recognize and take into account that further, performing inspections or other manual operation may be less efficient than desired.

The illustrative embodiments recognize and take into account that operators review sampling reports or other work instructions to determine a desired work location and a desired operation. The illustrative embodiments recognize and take into account that determining work locations on the actual workpiece may be more difficult or more time-consuming than desired. For example, the illustrative embodiments recognize and take into account that to find a fastener designated to receive inspection, currently operators count the fasteners in a large workpiece to find the work location. For example, an operator may count twenty fasteners up on a large workpiece to locate the fastener to receive an inspection. Likewise, an operator may count a designated number of fasteners from a current inspection location. The illustrative embodiments recognize and take into account that it would be desirable to have a more efficient method of determining work locations on large workpieces.

The illustrative embodiments recognize and take into account that, currently, operators use mechanical means, such as sticky notes, to mark and preserve work records for subsequent operations. The sticky notes may take the form of tape, adhesive backed paper, or any other product that may be adhered to the workpiece. The illustrative embodiments recognize and take into account that operators may also write notations on the sticky notes to preserve work records. The illustrative embodiments recognize and take into account that it would be desirable to have centralized records of work locations.

The illustrative embodiments recognize and take into account that conventional laser tracking equipment is undesirably costly. The illustrative embodiments recognize and take into account that conventional laser tracking equipment may have a higher accuracy than is needed for several operations. The illustrative embodiments recognize and take into account that a speed of conventional laser tracking systems may be limited by the size of the laser tracking system. The illustrative embodiments recognize and take into account that conventional laser tracking equipment may effectively hunt within about a square inch. The illustrative embodiments recognize and take into account that either a broken beam or too large a search area may result in conventional laser tracking equipment "erroring out."

The illustrative embodiments recognize and take into account that there are several conventional radio frequency technologies such as Wi-Fi, Bluetooth, RFID, or GPS signals that may be used for locating objects. However, the illustrative embodiments recognize and take into account that the conventional Wi-Fi, Bluetooth, RFID, or GPS signals may not provide a desired accuracy for manufacturing operations. For example, illustrative embodiments recognize and take into account that conventional radio frequency technologies may have an accuracy of +/−3 inches or greater.

The illustrative embodiments recognize and take into account that it would be desirable to have a system to provide seamless integration between work measurement location and work management systems. The illustrative embodiments recognize and take into account that a system would desirably easily integrate into existing portable factory production and quality tools.

Referring now to the figures and, in particular, with reference to FIG. 1, an illustration of a block diagram of a manufacturing environment in which a hybrid manufacturing environment position locating system is used to locate a tool is depicted in accordance with an illustrative embodiment. Manufacturing environment 100 includes workpiece 102 to receive operation 104. In some illustrative examples, operation 104 is selected from one of inspection operation 106, fastening operation 108, drilling operation 110, and painting operation 112. Performing operation 104 on workpiece 102 generates data 114.

Hybrid position locating system 116 is present in manufacturing environment 100 to locate tool 118 within manufacturing environment 100. In some illustrative examples, tool 118 is used to perform operation 104. For example, tool 118 may be a micrometer to perform inspection operation 106. In another illustrative example, tool 118 may be a drill used to create a hole or install a fastener. In some illustrative examples, tool 118 is used to transmit data 114 from operation 104. In some other illustrative examples, tool 118 may not be used to perform operation 104. In some illustrative examples, tool 118 may be used only to perform locating processes.

Hybrid position locating system 116 comprises ultra-wide band radio frequency tag 120 connected to tool 118 and retro reflective target 122 connected to tool 118. Retro reflective target 122 may take any desirable form. For example, retro reflective target 122 may take the form of tape or a corner cube. As depicted, ultra-wide band radio frequency tag 120 is part of macro position locator 124. Hybrid position locating system 116 also comprises plurality of ultra-wide band radio frequency anchors 126 at known positions 128 within manufacturing environment 100.

Macro position locator 124 locates ultra-wide band radio frequency tag 120 attached to tool 118 within manufacturing environment 100 to form approximate location 130. Using plurality of ultra-wide band radio frequency anchors 126 and triangulation, approximate location 130 is determined. Macro position locator 124 is desirably fast, but accuracy 132 is not sufficient to locate tool 118 for operation 104 on workpiece 102. In some illustrative examples, macro position locator 124 has accuracy 132 to within +/−2.5 inches.

Ultra-wide band radio frequency tag 120 is located in X, Y, Z coordinates based on the triangulated Radio Frequency (RF) signal strength of plurality of ultra-wide band radio frequency anchors 126 at known positions 128 within manufacturing environment 100. Ultra-wide band radio frequency tag 120 and plurality of ultra-wide band radio frequency anchors 126 are relative inexpensive and commercially available.

Although not depicted, in some illustrative examples, ultra-wide band radio frequency tag 120 is equipped with a 3-axis accelerometer, gyroscope, and magnetometer which give the orientation of ultra-wide band radio frequency tag 120 in manufacturing environment 100. Although not depicted, in some illustrative examples, each of plurality of ultra-wide band radio frequency anchors 126 is equipped with a 3-axis accelerometer, gyroscope, and magnetometer which give the orientation of the respective radio frequency anchor in manufacturing environment 100.

Macro position locator 124 in the form of plurality of ultra-wide band radio frequency anchors 126 and ultra-wide band radio frequency tag 120 has several desirable operating features. In some illustrative examples, plurality of ultra-wide band radio frequency anchors 126 and ultra-wide band radio frequency tag 120 form a factory mesh network for cell communications. Additionally, plurality of ultra-wide band radio frequency anchors 126 and ultra-wide band radio frequency tag 120 are low power and battery operable. Battery operable components, such as plurality of ultra-wide band radio frequency anchors 126 and ultra-wide band radio frequency tag 120, reduce wires in manufacturing environment 100. Reducing wires in manufacturing environment 100 reduces complexity of movement in manufacturing environment 100. When macro position locator 124 is wireless, the set-up time for macro position locator 124 may also be reduced.

In some illustrative examples, ultra-wide band radio frequency tag 120 can communicate and can be powered via USB. Additionally, in some illustrative examples, ultra-wide band radio frequency tag 120 can be linked to computer 164.

Approximate location 130 is sent to micro position locator 134 to aid in generating a location with greater accuracy than approximate location 130. Micro position locator 134 identifies refined location 136 using approximate location 130. Micro position locator 134 has accuracy 138 greater than accuracy 132 of macro position locator 124. In some illustrative examples, micro position locator 134 has accuracy 138 sufficient to distinguish different locations on workpiece 102 to receive operation 104. In some illustrative examples micro position locator 134 has accuracy 138 to within +/−1 inch. In some illustrative examples, micro position locator 134 has accuracy 138 to within +/−0.5 inch. In other illustrative examples, micro position locator 134 has accuracy 138 to within +/−0.25 inch.

In some illustrative examples, hybrid position locating system 116 comprises set of laser tracking systems 140 within manufacturing environment 100. As used herein, a "set" of items is one or more items. Accordingly, "set of laser tracking systems 140" is one or more laser tracking systems. As depicted, set of laser tracking systems 140 has laser tracking system 142. However, in other illustrative examples, set of laser tracking systems 140 comprises more than one laser tracking system.

Each laser tracking system of set of laser tracking systems 140 is secured at a respective fixed position in manufacturing environment 100 to form tracking assembly 144. Each respective fixed position in tracking assembly 144 is configured such that set of laser tracking systems 140 provides complete coverage of work area 146 of workpiece 102. Work area 146 is an area of workpiece 102 upon which operation 104 will be performed.

As depicted, laser tracking system 142 is secured at respective fixed position 148. Respective fixed position 148 is configured such that set of laser tracking systems 140 provides complete coverage of work area 146 of workpiece 102. In some illustrative examples, laser tracking system 142 has a 90-degree cone of projection and tracking. In these illustrative example, respective fixed position 148 takes into account the 90-degree cone of projection and tracking.

In some illustrative examples, set of laser tracking systems 140 is mounted on a scaffolding (not depicted), a building (not depicted), another workpiece (not depicted) within manufacturing environment 100, work stands (not depicted) at intervals, or any other desirable form of mounting equipment 141 within manufacturing environment 100 to provide complete coverage of work area 146. In some illustrative examples, tracking assembly 144 is battery powered.

As depicted, laser tracking system 142 comprises micro mirror 150 configured for laser beam 152 steering. In some illustrative examples, laser beam 152 is steered using tracking algorithm 161 associated with laser tracking system 142. Micro mirror 150 may have any desirable size. In some illustrative examples, micro mirror 150 is in the range of 1 mm-3 mm in diameter. Steering of laser beam 152 is performed by moving micro mirror 150.

In some illustrative examples, micro mirror 150 is a two axis mirror. In some illustrative examples, micro mirror 150 is a scanning two axis (tip-tilt) MEMS mirror. In laser tracking system 142, micro mirror 150 is implemented as an optical beam-steering (or 2D optical scanning) technology.

In this illustrative example, laser beam 152 is steered by micro mirror 150. Additionally, laser tracking system 142 is used to project image 154 onto workpiece 102. In this illustrative example, laser tracking system 142 can be commanded wirelessly to project vector graphics, in the form of image 154, on to workpiece 102 to guide work instructions for operation 104. For example, image 154 may take the form of pickup locations or inspection zones for operation 104.

In some illustrative examples, image 154 indicates location 156 of workpiece 102 to receive operation 104. For example, image 154 may comprise a circle around a fastener of workpiece 102 to receive inspection operation 106. As another example, image 154 may comprise a design for painting operation 112.

With the presence of light power detector 158, micro mirror 150 can also "track" retro reflective target 122. In some illustrative examples, light power detector 158 is part of mirror assembly 159 containing micro mirror 150. In some other illustrative examples, light power detector 158 is separate from micro mirror 150. Light power detector 158 detects laser energy 160 reflected from retro reflective target 122. In some illustrative examples, refined location 136 of retro reflective target 122 can be computed using angles of micro mirror 150.

Laser tracking system 142 initially directs laser beam 152 towards approximate location 130. In some illustrative examples, controller 162 is communicatively connected to ultra-wide band radio frequency tag 120. In these illustrative examples, ultra-wide band radio frequency tag 120 transmits approximate location 130

In one illustrative example, macro position locator 124 continually operates. In another illustrative example, macro position locator 124 begins operation based on input.

In one illustrative example, an operator (not depicted) provides input to macro position locator 124. In one illustrative example, the input may take the form of the operator pressing a button on tool 118. After receiving input, the ultra-wide band radio frequency tag 120 wirelessly signals controller 162 in the laser tracking system 142 to precisely locate retro reflective target 122. Ultra-wide band radio frequency tag 120 sends approximate location 130 of tool 118 to laser tracking system 142 which points micro mirror 150 at approximate location 130 and begins a tracking search pattern. When laser beam 152 strikes retro reflective target 122, laser energy 160 reflects back to light power detector 158. After receiving laser energy 160, tracking algorithm 161 of controller 162 locks onto retro reflective target 122. Controller 162 computes X, Y, Z coordinates of retro reflective target 122 to form refined location 136.

In some illustrative examples, controller 162 wirelessly sends refined location 136 to tool 118 for display. In some illustrative examples, controller 162 sends refined location 136 to computer 164 for storage and correlation to data 114. In some illustrative examples, tool 118 correlates data 114 from operation 104 with refined location 136. In these illustrative examples, tool 118 sends data 114 and refined location 136 to computer 164 for storage.

Controller 162 and computer 164 may communicate in any desirable way. Controller 162 and computer 164 may communicate wirelessly or through a wired connection. Controller 162 may send refined location 136 to computer 164 or tool 118 automatically or in response to receiving an input.

Tool 118 and computer 164 may communicate wirelessly or through a wired connection. In some illustrative examples, when tool 118 transmits data 114 to computer 164 using a wired communication connection, tool 118 will send data 114 after being connected to computer 164. For example, tool 118 may store data 114 until tool 118 and computer 164 are connected following operation 104. In this example, tool 118 may remain free of wires until after operation 104 is complete.

In some illustrative examples, workpiece 102 is component 166 of aircraft 168. When workpiece 102 is component 166 of aircraft 168, workpiece 102 may be extremely large, such as a wing or a fuselage.

When workpiece 102 is component 166 of aircraft 168, set of laser tracking systems 140 may be secured to a portion of aircraft 168. For example, set of laser tracking systems 140 may be secured to the interior of the fuselage barrel (not depicted) of aircraft 168. When set of laser tracking systems 140 is secured to a portion of aircraft 168, tracking assembly 144 would be semi-permanent. Additionally, when set of laser tracking systems 140 is secured to a portion of aircraft 168, tracking assembly 144 could be self-checking or calibrating on fixed monuments and/or on fixed targets on aircraft 168.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, set of laser tracking systems 140 may include any desirable quantity of laser tracking systems. In some illustrative examples, set of laser tracking systems 140 may include more than just laser tracking system 142.

In some illustrative examples, when set of laser tracking systems 140 contains more than one laser tracking system, refined location 136 may be determined using triangulation. For example, more than one laser tracking system of set of laser tracking systems 140 may direct a respective laser beam at approximate location 130. Each utilized laser tracking system would use a tracking algorithm until the respective laser beam was desirably reflected from retro reflective target 122, resulting in a respective estimated location for retro reflective target 122 from each utilized laser tracking system. Using the respective estimated locations provided by each of the utilized laser tracking systems and triangulation, refined location 136 is determined.

Any desirable quantity of laser tracking systems from set of laser tracking systems 140 may be used with triangulation. In some illustrative examples, each laser tracking system of set of laser tracking systems 140 is used with triangulation. In some illustrative examples, only a fraction of set of laser tracking systems 140 is used with triangulation.

Figure 2:
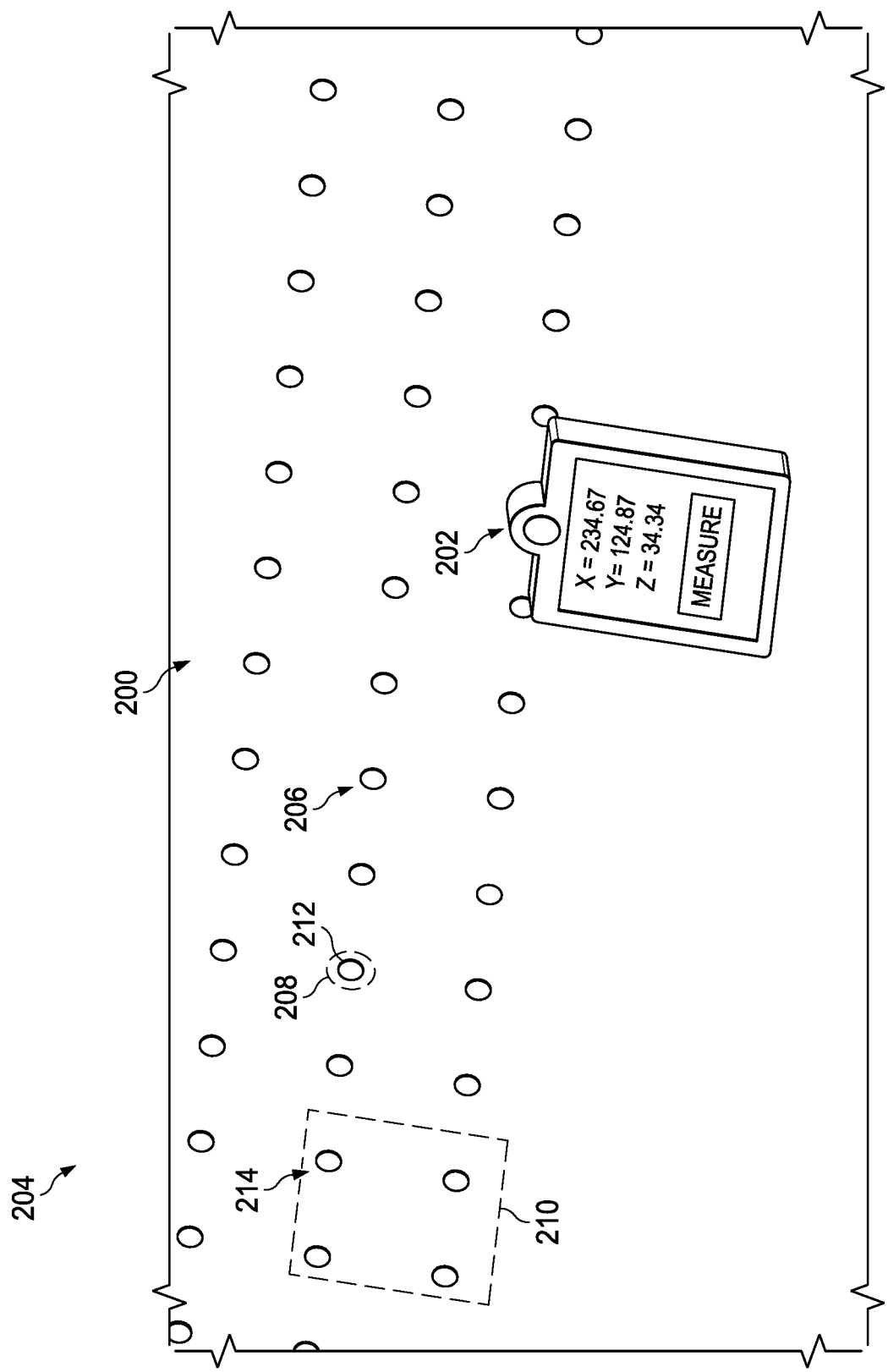
FIG. 2 is an illustration of a workpiece with fasteners to be inspected in accordance with an illustrative embodiment.

Turning now to FIG. 2, an illustration of a workpiece with fasteners to be inspected is depicted in accordance with an illustrative embodiment. Workpiece 200 is a physical implementation of workpiece 102 of FIG. 1. Tool 202 is positioned relative to workpiece 200 in manufacturing environment 204. Tool 202 is a physical implementation of tool 118 of FIG. 1.

As depicted, fasteners 206 are present in workpiece 200. In some illustrative examples, it is desired to inspect fasteners 206. Tool 202 is used to perform at least one of: inspecting fasteners 206 or transmitting data related to inspecting fasteners 206.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In some illustrative examples, a subset of fasteners 206 is inspected. This subset may be designated in a work instruction. When a work instruction (not depicted) includes an operation relative to a fastener of fasteners 206, it is desirable to locate the respective fastener of fasteners 206.

As depicted, image 208 and image 210 are projected onto workpiece 200. Image 208 and image 210 are representative of work instructions. For example, an operator may inspect fastener 212 within image 208. As another example, an operator may inspect fasteners 214 within image 210.

Although FIG. 2 is depicted as involving performing an operation relative to fasteners 206, this is a non-limiting example. Locating is not limited to operations involving fasteners. In other non-depicted examples, workpiece 200 does not have fasteners 206. In other non-depicted examples, fasteners 206 are present but locating is performed for other portions of workpiece 200 other than fasteners 206. Locating in the illustrative examples may be performed for any desirable portion of workpiece 200.

Figure 3:
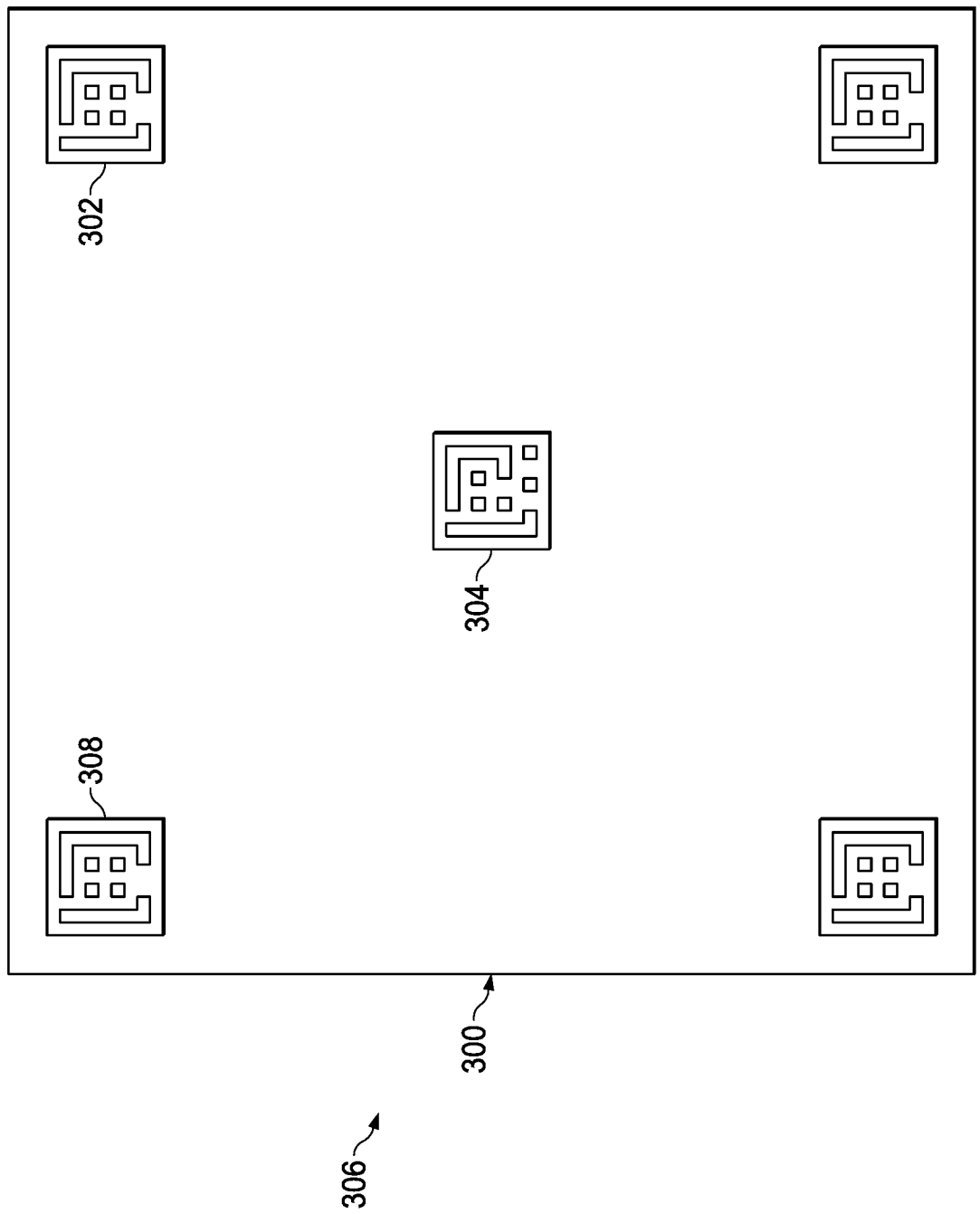
FIG. 3 is an illustration of a macro position locator in accordance with an illustrative embodiment.

Turning now to FIG. 3, an illustration of a macro position locator is depicted in accordance with an illustrative embodiment. Macro position locator 300 is a physical implementation of macro position locator 124 of FIG. 1. Macro position locator 300 comprises plurality of ultra-wide band radio frequency anchors 302 and ultra-wide band radio frequency tag 304.

To identify an approximate location of a tool in manufacturing environment 306, ultra-wide band radio frequency tag 304 would be connected to the tool (not depicted). To identify an approximate location of the tool, the position of ultra-wide band radio frequency tag 304 is triangulated using plurality of ultra-wide band radio frequency anchors 302 in known locations 308 in manufacturing environment 306.

Figure 4:
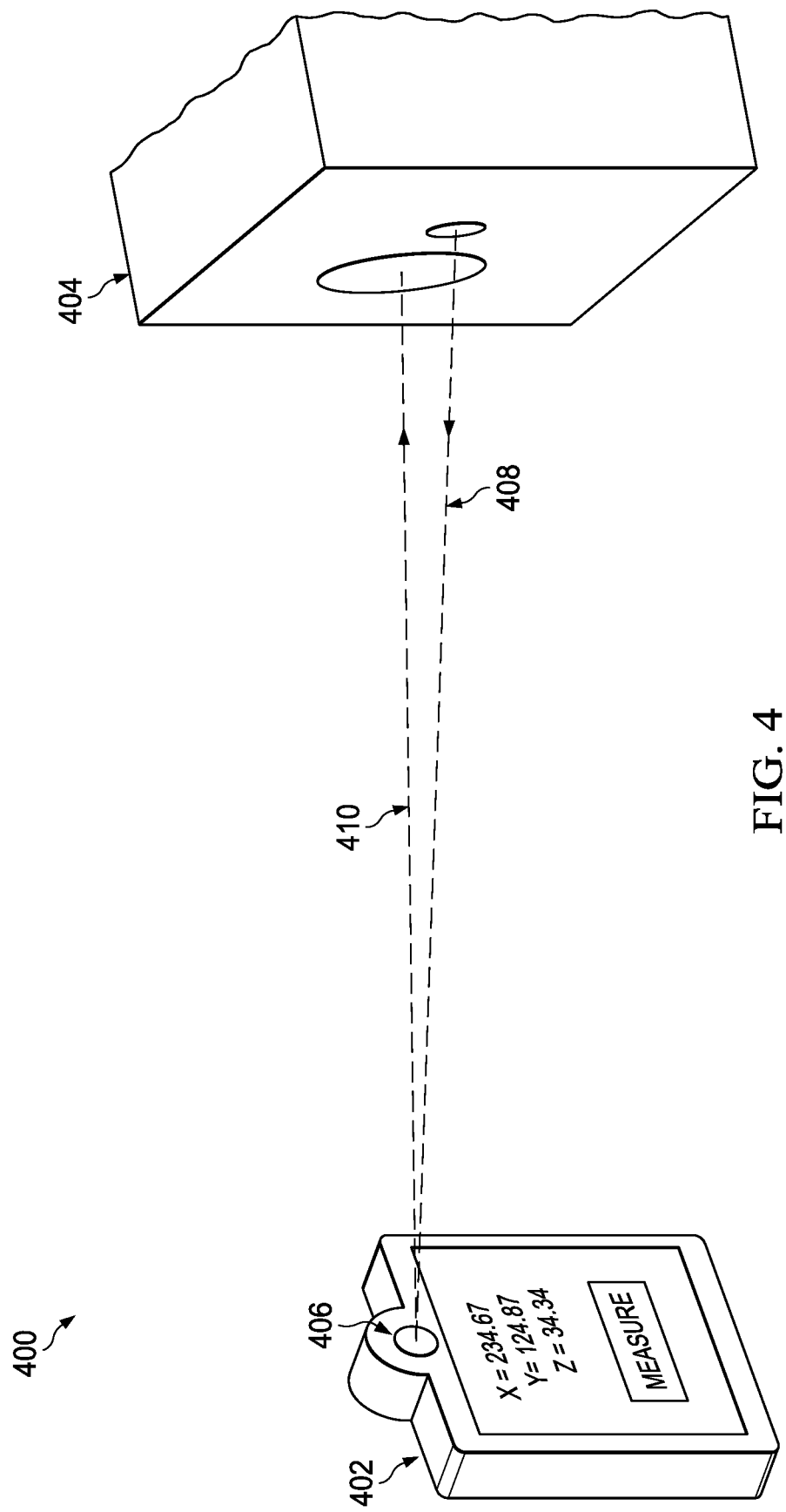
FIG. 4 is an illustration of a micro position locator in accordance with an illustrative embodiment.

Turning now to FIG. 4, an illustration of a micro position locator is depicted in accordance with an illustrative embodiment. Micro position locator 400 is a physical implementation of micro position locator 134. Micro position locator 400 is configured to determine a refined location of tool 402 using an approximate location provided to micro position locator 400.

Micro position locator 400 comprises laser tracking system 404 and retro reflective target 406 connected to tool 402. Laser tracking system 404 determines refined location of tool 402 from laser energy reflected by retro reflective target 406.

Laser tracking system 404 directs laser beam 408 to the approximate location provided by a macro position locator, such as macro position locator 124 of FIG. 1. Laser tracking system 404 then steers laser beam 408 to "hunt" for retro reflective target 406. To steer laser beam 408, a micro mirror (not depicted) within laser tracking system 404 is moved. Due to its small size, movement of the micro mirror, and subsequent steering of laser beam 408 is considerably faster than larger conventional laser tracking systems.

When laser beam 408 strikes retro reflective target 406, laser energy 410 is reflected. Laser tracking system 404 detects laser energy 410 reflected from retro reflective target 406. In some illustrative examples, a refined location (not depicted) of retro reflective target 406 can be computed using angles of laser energy 410. In some illustrative examples, the refined location of retro reflective target 406 can be computed using angles of the micro mirror (not depicted).

Figure 5:
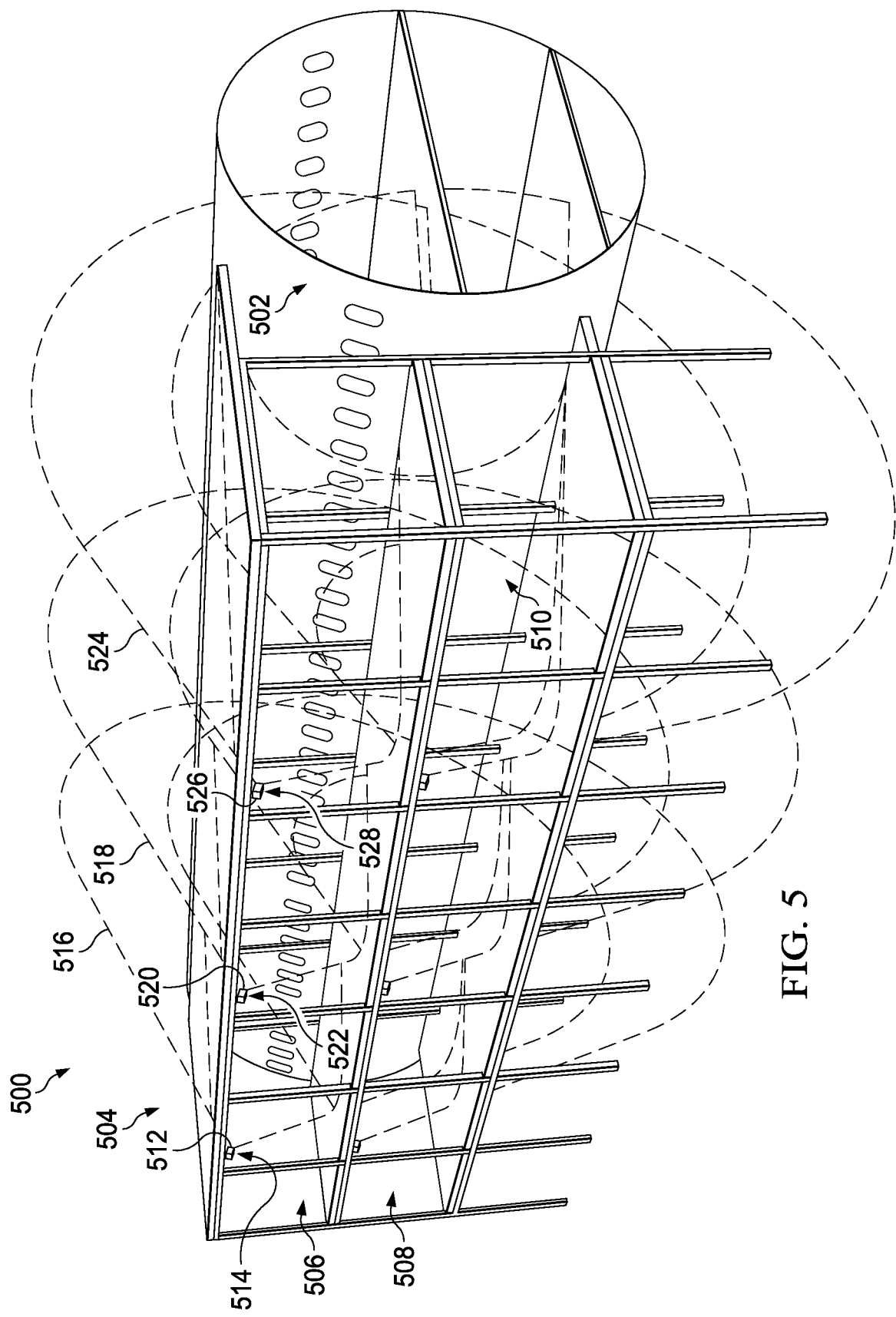
FIG. 5 is an illustration of a manufacturing environment with a hybrid position locating system installed in accordance with an illustrative embodiment.

Turning now to FIG. 5, an illustration of a manufacturing environment with a hybrid position locating system installed is depicted in accordance with an illustrative embodiment. Manufacturing environment 500 is a physical implementation of manufacturing environment 100. Workpiece 502 is a physical implementation of workpiece 102 in FIG. 1. Hybrid position locating system 504 comprises set of laser tracking systems 506. Hybrid position locating system 504 is a physical implementation of hybrid position locating system 116 of FIG. 1.

Each laser tracking system of set of laser tracking systems 506 is secured at a respective fixed position in manufacturing environment 500 to form tracking assembly 508. Each respective fixed position in tracking assembly 508 is configured such that set of laser tracking systems 506 provides complete coverage of work area 510 of workpiece 502.

For example, laser tracking system 512 is secured at respective fixed position 514. Coverage 516 of laser tracking system 512 overlaps coverage 518 of laser tracking system 520. Laser tracking system 520 is secured at respective fixed position 522. Coverage 518 of laser tracking system 520 overlaps coverage 524 of laser tracking system 526. Laser tracking system 526 is secured at respective fixed position 528. Each of respective fixed position 514, respective fixed position 522, and respective fixed position 528 are selected such that set of laser tracking systems 506 provides complete coverage of work area 510 of workpiece 502.

Figure 6:
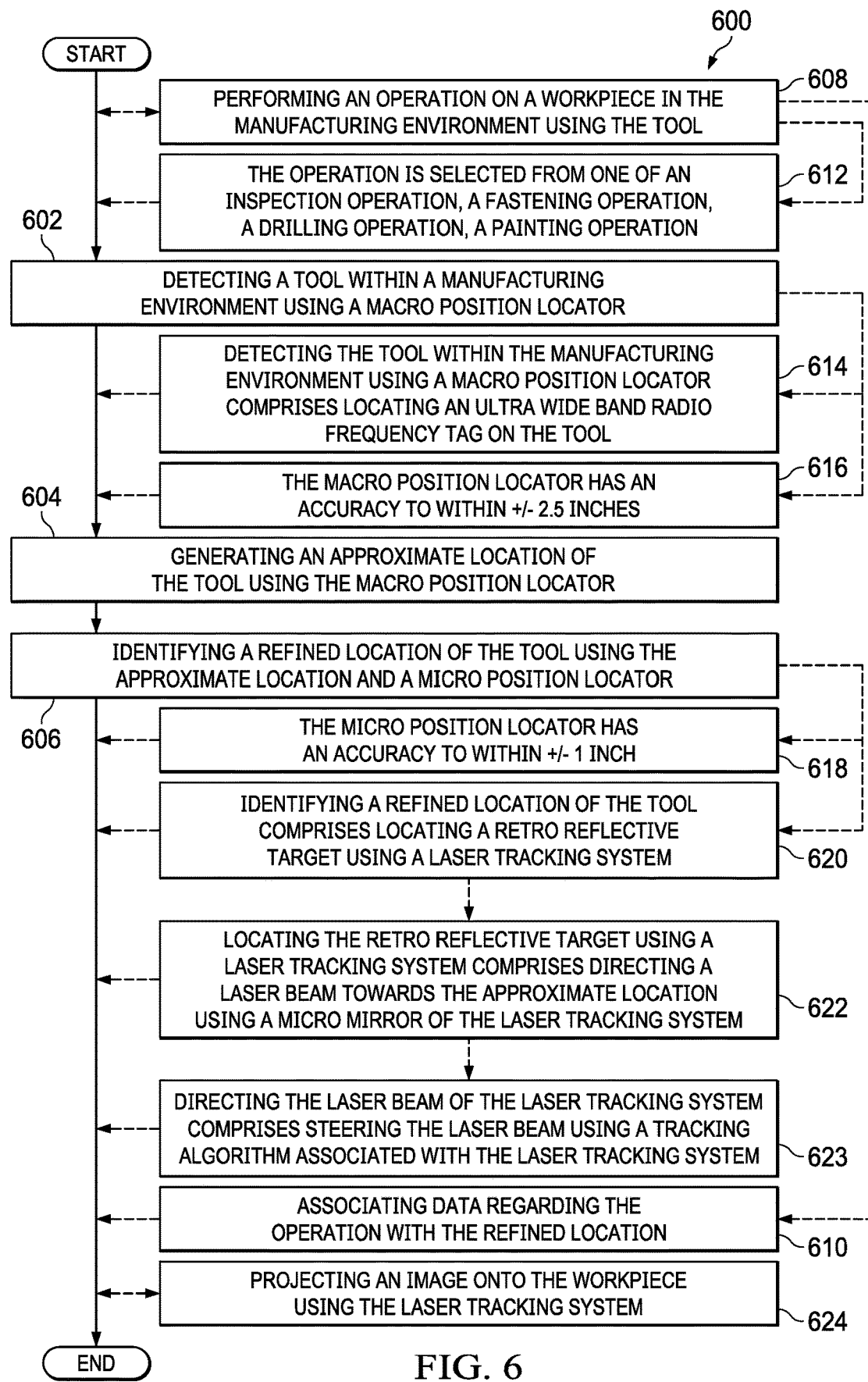
FIG. 6 is an illustration of a flowchart of a method for identifying a position of a tool in accordance with an illustrative embodiment.

Turning now to FIG. 6, an illustration of a flowchart of a method for identifying a position of a tool is depicted in accordance with an illustrative embodiment. Method 600 may be performed using hybrid position locating system 116 of FIG. 1 to locate a position of tool 118. Method 600 may be performed to determine a location of tool 202 of FIG. 2. Method 600 may be performed using macro position locator 300 of FIG. 3 and micro position locator 400 of FIG. 4. Method 600 may be performed in manufacturing environment 500 of FIG. 5.

Method 600 detects a tool within a manufacturing environment using a macro position locator (operation 602). Method 600 generates an approximate location of the tool using the macro position locator (operation 604). Method 600 identifies a refined location of the tool using the approximate location and a micro position locator (operation 606). Afterwards, the method terminates.

In some illustrative examples, method 600 performs an operation on a workpiece using the tool (operation 608). In some illustrative examples, method 600 associates data regarding the operation with the refined location (operation 610). In some illustrative examples, the operation is selected from one of an inspection operation, a fastening operation, a drilling operation, or a painting operation (operation 612).

In some illustrative examples, detecting the tool within the manufacturing environment using a macro position locator comprises locating an ultra-wide band radio frequency tag on the tool (operation 614). In some illustrative examples, the macro position locator has an accuracy to within +/−2.5 inches (operation 616). The macro position locator does not have sufficient accuracy for identifying the location of many manufacturing operations. Accuracy of +/−2.5 inches reduces the field of search for the micro position locator. For example, a laser tracking system will search within a smaller region for a retro reflective target.

In some illustrative examples, the micro position locator has an accuracy to within +/−1 inch (operation 618). In some illustrative examples, the micro position locator has an accuracy to within +/−0.5 inch. The micro position locator provides sufficient accuracy to differentiate different finite locations on a workpiece. For example, the micro position locator provides sufficient accuracy to differentiate between different fastener locations of a workpiece. As another example, the micro position locator provides sufficient accuracy to differentiate between different hole locations in a workpiece.

In some illustrative examples, identifying a refined location of the tool comprises locating a retro reflective target using a laser tracking system (operation 620). In some illustrative examples, locating the retro reflective target using a laser tracking system comprises directing a laser beam towards the approximate location using a micro mirror of the laser tracking system (operation 622). In some illustrative examples, directing the laser beam of the laser tracking system comprises steering the laser beam using a tracking algorithm associated with the laser tracking system (operation 623).

In some illustrative examples the macro position locator is a laser tracking system, and method 600 projects an image onto the workpiece using the laser tracking system (operation 624). In some illustrative examples, the workpiece is a component of an aircraft.

Figure 7:
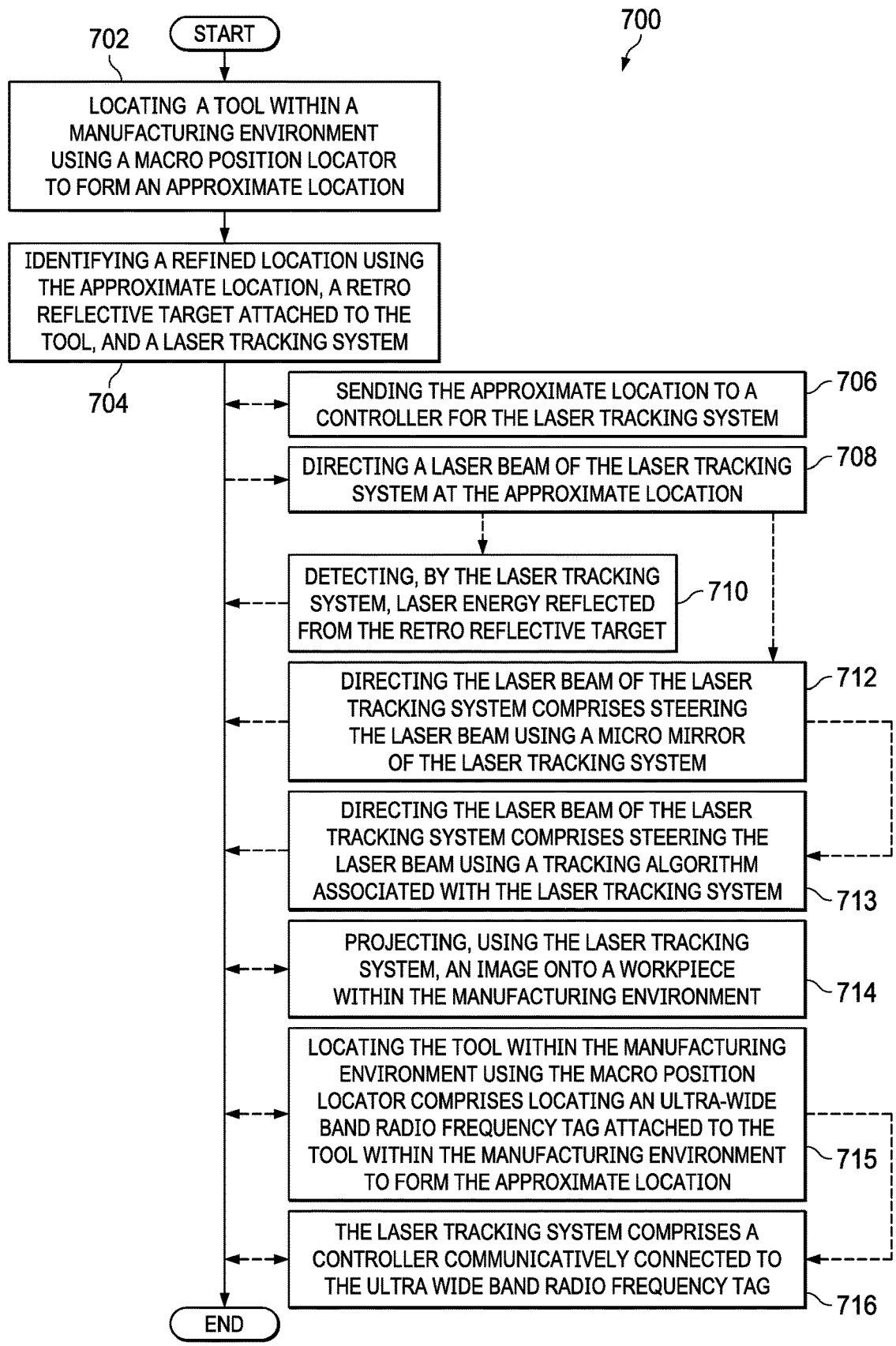
FIG. 7 is an illustration of a flowchart of a method for identifying a position of a tool in accordance with an illustrative embodiment.

Turning now to FIG. 7, an illustration of a flowchart of a method for identifying a position of a tool is depicted in accordance with an illustrative embodiment. Method 700 may be performed using hybrid position locating system 116 of FIG. 1 to locate a position of tool 118. Method 700 may be performed to determine a location of tool 202 of FIG. 2. Method 700 may be performed using macro position locator 300 of FIG. 3 and micro position locator 400 of FIG. 4. Method 700 may be performed in manufacturing environment 500 of FIG. 5.

Method 700 locates a tool within a manufacturing environment using a macro position locator to form an approximate location (operation 702). Method 700 identifies a refined location using the approximate location, a retro reflective target attached to the tool, and a laser tracking system (operation 704). Afterwards, the method terminates.

In some illustrative examples, method 700 sends the approximate location to a controller for the laser tracking system (operation 706). In some illustrative examples, method 700 directs a laser beam of the laser tracking system at the approximate location (operation 708). In some illustrative examples, method 700 detects, by the laser tracking system, laser energy reflected from the retro reflective target (operation 710).

In some illustrative examples, directing the laser beam of the laser tracking system comprises steering the laser beam using a micro mirror of the laser tracking system (operation 712). In some illustrative examples, directing the laser beam of the laser tracking system comprises steering the laser beam using a tracking algorithm associated with the laser tracking system (operation 713). In some illustrative examples, method 700 projects, using the laser tracking system, an image onto a workpiece within the manufacturing environment (operation 714).

In some illustrative examples, locating the tool within the manufacturing environment using the macro position locator comprises locating an ultra-wide band radio frequency tag attached to the tool within the manufacturing environment to form the approximate location (operation 715). In some illustrative examples, the laser tracking system comprises a controller communicatively connected to the ultra-wide band radio frequency tag (operation 716).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 600 or method 700 are performed. For example, operations 612 through 624 of FIG. 6 are optional. As another example, operations 706 through 716 of FIG. 7 are optional.

Figure 8:
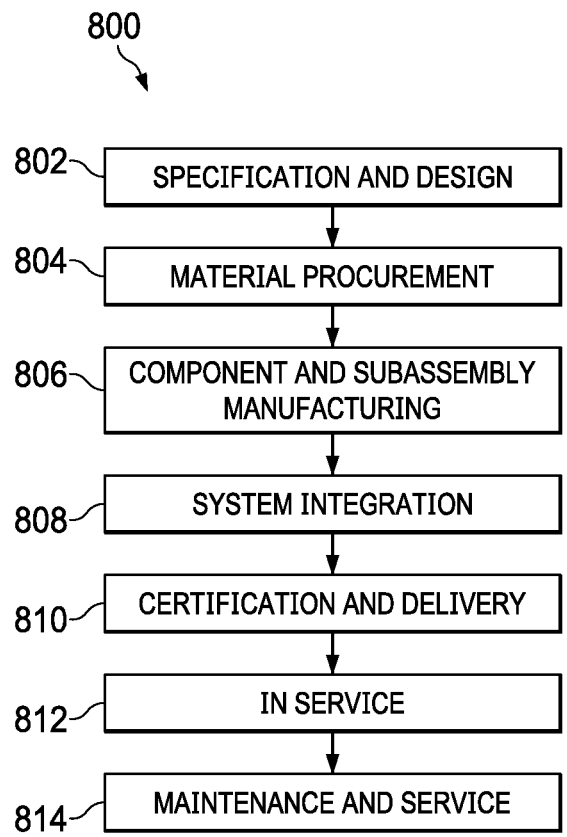
FIG. 8 is an illustration of an aircraft manufacturing and service method in the form of a block diagram in accordance with an illustrative embodiment.
Figure 9:
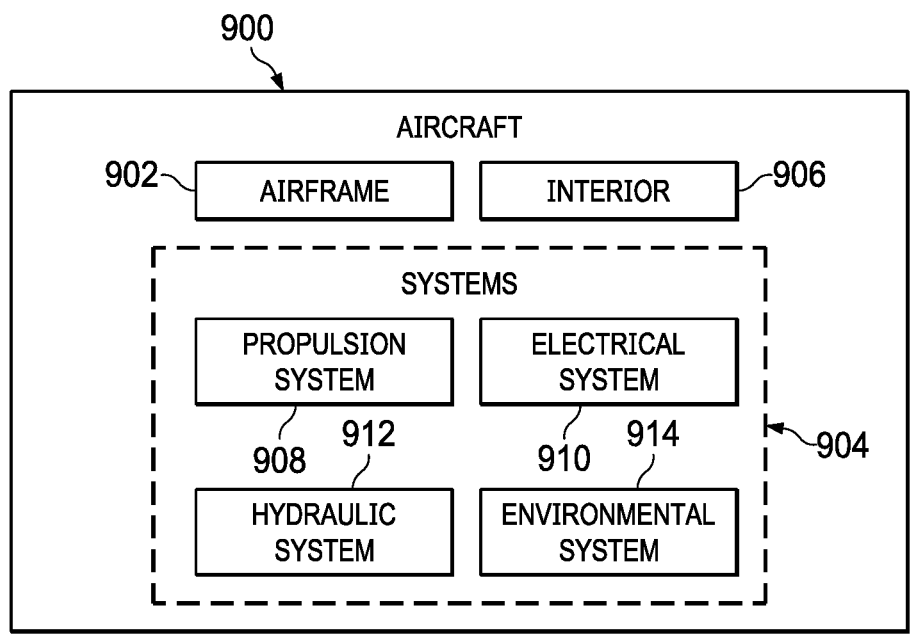
FIG. 9 is an illustration of an aircraft in the form of a block diagram in which an illustrative embodiment may be implemented.

The illustrative embodiments of the present disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 takes place. Thereafter, aircraft 900 may go through certification and delivery 810 in order to be placed in service 812. While in service 812 by a customer, aircraft 900 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with a plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800. One or more illustrative embodiments may be used during component and subassembly manufacturing 806, system integration 808, or maintenance and service 814 of FIG. 8. For example, hybrid position locating system 116 of FIG. 1 may be used to determine a position of a tool, such as tool 118, used to inspect a component during component and subassembly manufacturing 806. As another example, hybrid position locating system 116 of FIG. 1 may be used to determine a position of a tool, such as tool 118, used to inspect a portion of aircraft 900 during maintenance and service 814 of FIG. 8.

Apparatuses and methods embodied herein may be employed in manufacturing at least one component of aircraft 900. For example, hybrid position locating system 116 of FIG. 1 may be used to locate a tool during manufacturing of airframe 902 or interior 906.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   detecting a tool within a manufacturing environment using a macro position locator;
   generating an approximate location of the tool using the macro position locator; and
   identifying a refined location of the tool using the approximate location and a micro position locator by locating a retro reflective target using a laser tracking system, wherein locating the retro reflective target using a laser tracking system comprises directing a laser beam towards the approximate location using a micro mirror of the laser tracking system.

2. The method of claim 1, wherein detecting the tool within the manufacturing environment using a macro position locator comprises locating an ultra-wide band radio frequency tag on the tool.

3. The method of claim 1, wherein directing the laser beam of the laser tracking system comprises steering the laser beam using a tracking algorithm associated with the laser tracking system.

4. The method of claim 1 further comprising:
   performing an operation on a workpiece in the manufacturing environment using the tool; and
   associating data regarding the operation with the refined location.

5. The method of claim 4, wherein the macro position locator is a laser tracking system, the method further comprising:
   projecting an image onto the workpiece using the laser tracking system.

6. The method of claim 4, wherein the workpiece is a component of an aircraft.

7. The method of claim 4, wherein the operation is selected from one of an inspection operation, a fastening operation, a drilling operation, and a painting operation.

8. The method of claim 1, wherein the macro position locator has an accuracy to within +/−2.5 inches.

9. The method of claim 1, wherein the micro position locator has an accuracy to within +/−1 inch.

10. The method of claim 1, wherein steering the laser beam is performed by moving the micro mirror.

11. The method of claim 1, wherein the micro mirror is a scanning two axis MEMS mirror.

12. The method of claim 1, wherein the micro mirror is in the range of 1 mm-3 mm in diameter.

13. A method comprising:
- locating a tool within a manufacturing environment using a macro position locator to form an approximate location;
- sending the approximate location to a controller for a laser tracking system;
- directing a laser beam of the laser tracking system at the approximate location, wherein directing the laser beam of the laser tracking system comprises steering the laser beam using a micro mirror of the laser tracking system;
- detecting, by the laser tracking system, laser energy reflected from a retro reflective target attached to the tool; and
- identifying a refined location using the approximate location, the retro reflective target attached to the tool, and the laser tracking system.

14. The method of claim 13, wherein directing the laser beam of the laser tracking system comprises steering the laser beam using a tracking algorithm associated with the laser tracking system.

15. The method of claim 13 further comprising:
- projecting, using the laser tracking system, an image onto a workpiece within the manufacturing environment.

16. The method of claim 15, wherein the workpiece is a component of an aircraft.

17. The method of claim 13, wherein locating the tool within the manufacturing environment using the macro position locator comprises locating an ultra-wide band radio frequency tag attached to the tool within the manufacturing environment to form the approximate location.

18. The method of claim 17, wherein the laser tracking system comprises a controller communicatively connected to the ultra-wide band radio frequency tag.

19. The method of claim 13, wherein steering the laser beam is performed by moving the micro mirror.

20. The method of claim 13, wherein the micro mirror is a scanning two axis MEMS mirror.

21. A hybrid position locating system comprising:
- an ultra-wide band radio frequency tag connected to a tool in a manufacturing environment;
- a retro reflective target connected to the tool; and
- a laser tracking system within the manufacturing environment, wherein the laser tracking system comprises a micro mirror configured for laser beam steering.

22. The hybrid position locating system of claim 21 further comprising:
- a plurality of ultra-wide band radio frequency anchors at known positions within a manufacturing environment.

23. The hybrid position locating system of claim 22 further comprising:
- a set of laser tracking systems within the manufacturing environment.

24. The hybrid position locating system of claim 23, wherein each laser tracking system of the set of laser tracking systems is secured at a respective fixed position in the manufacturing environment to form a tracking assembly, and wherein each respective fixed position in the tracking assembly is configured such that the set of laser tracking systems provides complete coverage of a work area of a workpiece.

25. The hybrid position locating system of claim 24, wherein the workpiece is a component of an aircraft.

26. The hybrid position locating system of claim 21, wherein the laser tracking system comprises a controller communicatively connected to the ultra-wide band radio frequency tag.

27. The hybrid position locating system of claim 21, wherein the micro mirror is a scanning two axis MEMS mirror.

* * * * *